(12) United States Patent
Scalzo, III et al.

(10) Patent No.: US 10,658,806 B2
(45) Date of Patent: May 19, 2020

(54) BRUSH HOLDER APPARATUS HAVING BRUSH WEAR INDICATOR

(71) Applicant: General Electric Company, Schenectady, NY (US)

(72) Inventors: Frank Austin Scalzo, III, New Hartford, NY (US); Matthew Thomas Preston, Middletown, CT (US); Nolan Gregg Curwen, Galway, NY (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 15/486,644

(22) Filed: Apr. 13, 2017

(65) Prior Publication Data

US 2018/0301861 A1    Oct. 18, 2018

(51) Int. Cl.
| | |
|---|---|
| *H02K 13/00* | (2006.01) |
| *H01R 39/58* | (2006.01) |
| *H02K 5/14* | (2006.01) |
| *H01R 39/38* | (2006.01) |
| *H01R 39/40* | (2006.01) |

(52) U.S. Cl.
CPC ............ *H01R 39/58* (2013.01); *H02K 5/141* (2013.01); *H02K 13/003* (2013.01); *H01R 39/381* (2013.01); *H01R 39/40* (2013.01)

(58) Field of Classification Search
CPC .. H02K 2205/06; H02K 5/141; H02K 13/003; H02K 5/14; H02K 15/0006; H02K 5/145; H02K 5/146; H02K 11/20; H01R 39/40; H01R 39/38; H01R 43/00; H01R 39/58

USPC .................................................. 310/219-249
See application file for complete search history.

(56) References Cited

U.S. PATENT DOCUMENTS

| | | | |
|---|---|---|---|
| 3,654,504 A | 4/1972 | Susdorf et al. | |
| 4,172,988 A * | 10/1979 | Lowther ................ | H01R 39/58 310/242 |
| 4,333,095 A * | 6/1982 | Silva ...................... | H01R 39/58 200/61.41 |
| 4,366,404 A * | 12/1982 | Ziegler .................. | H01R 39/40 310/239 |
| 4,739,208 A * | 4/1988 | Kimberlin ............. | H01R 39/58 200/61.4 |
| 4,761,594 A * | 8/1988 | Rodi ...................... | H01R 39/58 310/242 |

(Continued)

*Primary Examiner* — Thanh Lam
(74) *Attorney, Agent, or Firm* — Fletcher Yoder, P.C.

(57) ABSTRACT

A brush holder apparatus has a stationary support member having two opposing grooves, a fork electrical connector, and a conductive bar configured to pass through a portion of a main body of the stationary support member. The conductive bar provides electrical conductivity with a collector mount and the fork electrical connector. A brush holder is configured to be releasably affixed to the stationary support member, and has two rails configured to slide along the grooves. The brush holder has a knife electrical connector configured to mate with the fork electrical connector. A brush spring is clipped on the brush holder, and the brush spring presses a brush against a collector of a dynamoelectric machine. A brush lead is connected to the brush and a brush terminal. The brush lead is an elongate conductive member, and a brush wear indicator is disposed over the brush lead.

10 Claims, 9 Drawing Sheets

(56) References Cited

U.S. PATENT DOCUMENTS

| | | | | |
|---|---|---|---|---|
| 5,070,270 A | * | 12/1991 | Morikane | H01R 39/40 |
| | | | | 310/239 |
| 6,579,439 B1 | | 6/2003 | Chandler | |
| 7,514,836 B2 | | 4/2009 | Berghanel | |
| 7,564,160 B2 | | 7/2009 | Cutsforth | |
| 7,880,363 B2 | | 2/2011 | Cutsforth | |
| 2014/0009142 A1 | * | 1/2014 | Cauwenberghs | H01R 39/58 |
| | | | | 324/207.11 |
| 2014/0265675 A1 | * | 9/2014 | Cutsforth | H01R 39/58 |
| | | | | 310/73 |
| 2015/0035777 A1 | | 12/2015 | Steinbach | |
| 2015/0035778 A1 | | 12/2015 | Steinbach | |
| 2015/0035779 A1 | | 12/2015 | Steinbach | |
| 2015/0035780 A1 | | 12/2015 | Steinbach | |
| 2018/0301860 A1 | * | 10/2018 | Scalzo, III | H01R 39/381 |
| 2018/0301962 A1 | * | 10/2018 | Scalzo, III | H02K 13/10 |

\* cited by examiner

BRUSH HOLDER APPARATUS HAVING BRUSH WEAR INDICATOR

BACKGROUND OF THE INVENTION

The subject matter disclosed herein relates to a brush holder apparatus. Specifically, the subject matter disclosed herein relates to a brush holder apparatus having a brush wear indicator that facilitates monitoring of brush wear.

Conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

In many commercially available systems the brush wear out limit is indicated by the top of the brush being identified as level with an aperture, notch or window machined within the wall of the brush box. Depending on the configuration and size of the machine, it can be very difficult to have the appropriate physical access or viewing angle in order to see that this condition is met, as the brushes extend at least partially circumferentially around the collector ring and many brushes are hidden or obscured by other machine parts.

BRIEF DESCRIPTION OF THE INVENTION

According to an aspect of the disclosure, a brush holder apparatus includes a stationary support member having two opposing grooves. The stationary support member has a fork electrical connector. The stationary support member has a conductive bar configured to pass through a portion of a main body of the stationary support member. The conductive bar is configured to provide electrical conductivity with (or between) a collector mount and the fork electrical connector. A brush holder is configured to be releasably affixed to the stationary support member. The brush holder has two rails configured to slide along the grooves, and the brush holder has a knife electrical connector configured to mate with the fork electrical connector. A brush spring is configured to be clipped on the brush holder, and the brush spring is also configured to press a brush against a collector of a dynamoelectric machine. A brush lead is connected to the brush and a brush terminal. The brush lead is an elongate conductive member, such as a wire or cable, and a brush wear indicator is disposed over the brush lead. The stationary support member is configured for electrical connection to the collector mount and the brush holder is configured to retain the brush. The brush wear indicator indicates brush wear in cooperation with a brush box.

According to another aspect of the disclosure, a brush holder apparatus has a brush holder having a brush lead connected to a brush and a brush terminal. The brush lead is an elongate conductive member. A brush wear indicator is disposed over the brush lead. The brush wear indicator may be a heat shrink/shrunk tube with adhesive located between the brush lead and the heat shrunk tube. The brush wear indicator may have a contrasting color to a color of the brush holder. The brush wear indicator may have multiple zones, with each of the multiple zones having a different color or pattern that correspond to a remaining brush life range or percent of brush used or remaining. The brush wear indicator may be configured so that a top end of the brush wear indicator is at or below a top end of a brush box when brush replacement is indicated or recommended. The brush wear indicator may have a band configured and located so that the brush wear indicator is at or below a top end of a brush box when brush replacement is indicated. The brush wear indicator may have indicia indicating approximate brush life remaining. The indicia may be multiple bands configured and located so that each band is at a top end of a brush box for a specific brush life remaining value, and/or numeric indicia indicating the brush life remaining in percent values.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
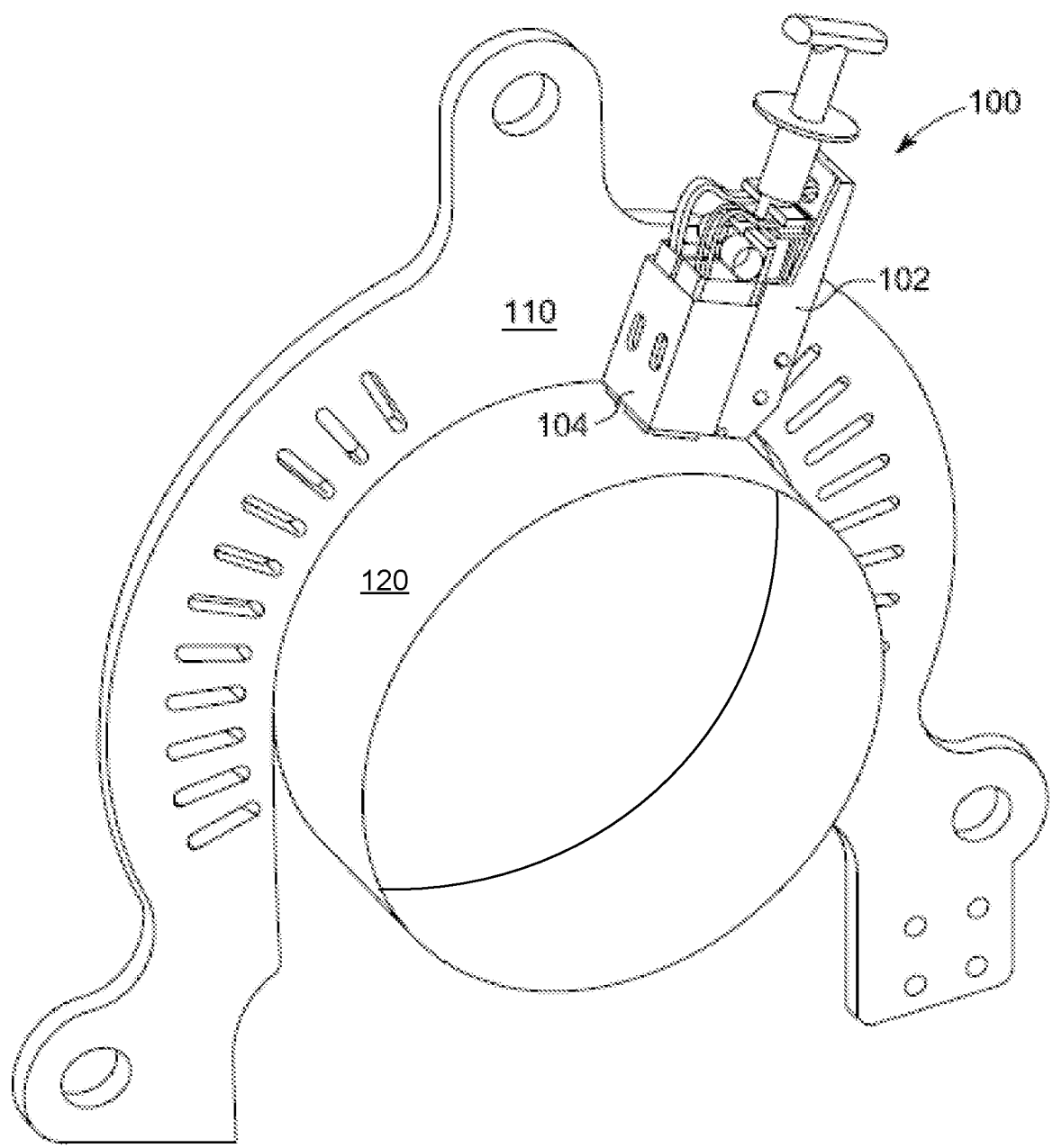
FIG. 1 illustrates a partial perspective view of a single brush holder installed on a collector horseshoe, according to an aspect of the present disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

In contrast to conventional brush holders, aspects of the disclosure include a brush holder apparatus for a dynamo-electric machine having a brush wear indicator disposed over a brush lead. As the brush wears, the brush and lead drop radially downward, with respect to a center axis of the rotor. The brush wear indicator may have one or more sections that can be compared to a top level of the brush box, and the position of the brush wear indicator relative to the brush box indicates the amount of brush wear, or remaining brush life.

FIG. 1 illustrates a partial perspective view of a single brush holder apparatus 100 installed on a collector horseshoe, according to an aspect of the present disclosure. A brush mount or collector horseshoe 110 is mounted over a collector ring 120. The collector ring rotates along with the rotor (not shown). A plurality of brushes and corresponding brush holders are attached to the collector horseshoe and are distributed at least partially around the collector ring. In this example, only a single brush holder apparatus 100 is shown attached to the collector horseshoe 110. The brush holder apparatus 100 may be bolted or screwed to the collector horseshoe. The brush holder apparatus 100 includes a stationary support member 102 and a brush holder 104. The stationary support member 102 is configured for electrical connection to the collector mount 110 (i.e., collector horseshoe 110), for example, by being fabricated of a conductive material or including a conductive material. The brush holder 104 is configured to retain the brush(es) (contained therein) at least in the axial and circumferential directions.

Figure 2:
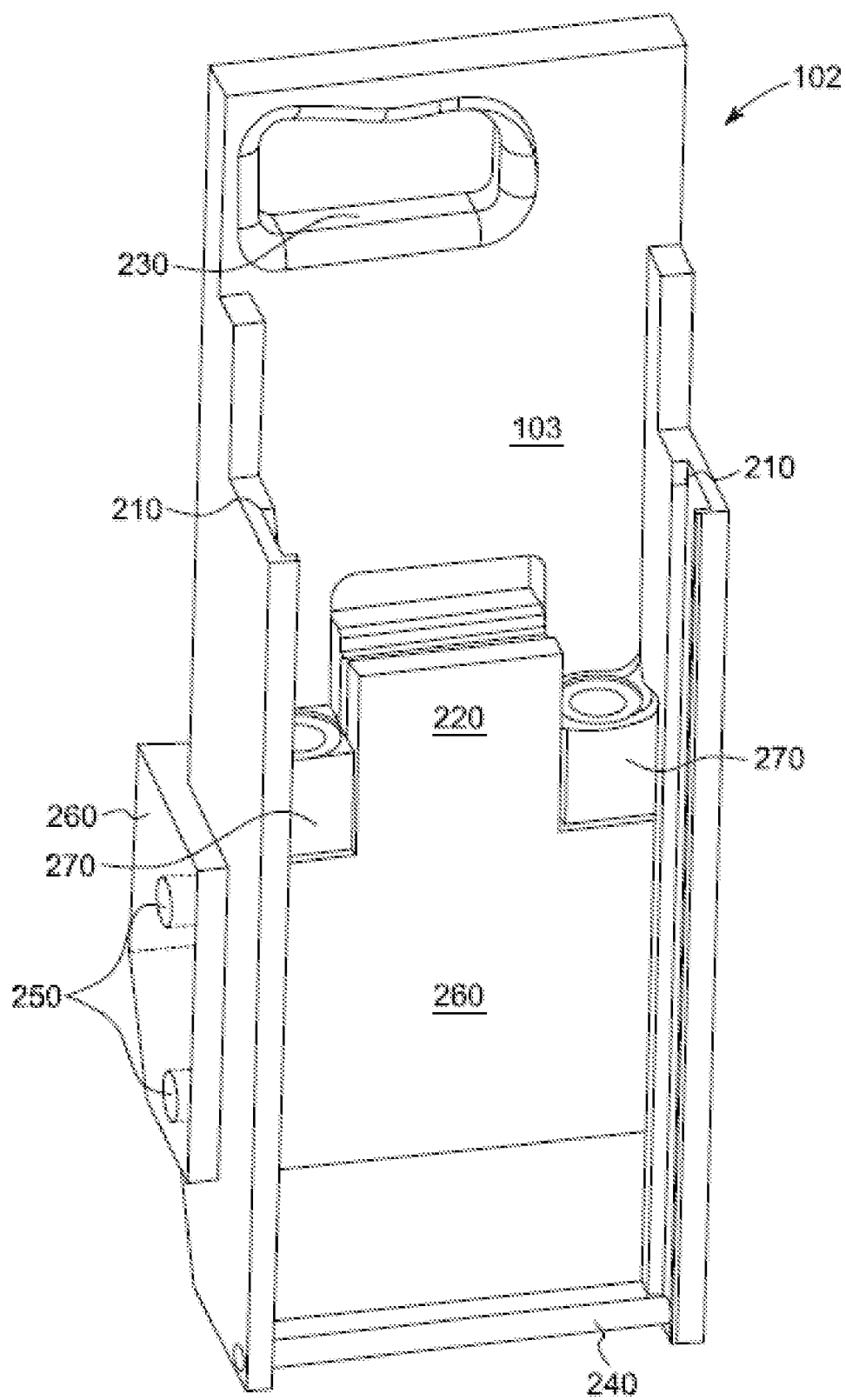
FIG. 2 illustrates a perspective view of the stationary support member, according to an aspect of the present disclosure.

FIG. 2 illustrates a perspective view of the stationary support member 102, according to an aspect of the present disclosure. The stationary support member 102 includes at least one groove 210 (two opposing grooves 210 are shown in FIG. 2) and a fork electrical connector 220. The fork electrical connector 220 may extend to one or both sides of the stationary support member, or alternatively the fork electrical connector may only be centrally located without extending to the sides of the stationary support member. A tapered slot 230 is located in an upper portion of the stationary support member 102, and the slot 230 is configured for cooperation with a locking pin 450 on the brush holder. The locking pin could also be replaced by a bar or latch or protrusion or disc with a ramped surface. The tapered nature of slot 230 acts to force the brush holder down into the connector 220 as the locking pin 450 is rotated. A bar 240 is located near a bottom end of the stationary support member 102, and this bar is configured to engage and restrain a cam on the brush holder 104. The bar 240 also serves to limit the distance the brush holder 104 can be inserted into the stationary support member 102. The brush holder 104 is fixed in position relative to the stationary support member 102 between the locking pin 450 at top and the bar 240 at the bottom. The bar 240 is fully contained within the profile of the stationary support member 102 and does not protrude past that profile. A plurality of holes 250 are provided and are configured to facilitate attachment of the stationary support member 102 to the collector mount 110. The holes 250 may be internally threaded for use with mechanical fasteners, such as bolts or screws. In addition, the holes 250 may be provided on both sides of the stationary support member 102 so that they are configured to attach a plurality of stationary support members together in a stacked or side-by-side arrangement. This may be desired when multiple brushes are stacked side-by-side. For example, 3, 4, 5, 6, 7 or more brushes may be arranged at one circumferential location on collector horseshoe 110. A conductive bar 260 is located on one or more sides of the stationary support member 102. The conductive bar 260 is configured to provide electrical conductivity with the collector mount (collector horseshoe 110) and/or a second stationary support member (e.g., connected to the side of the first stationary support member).

Figure 3:
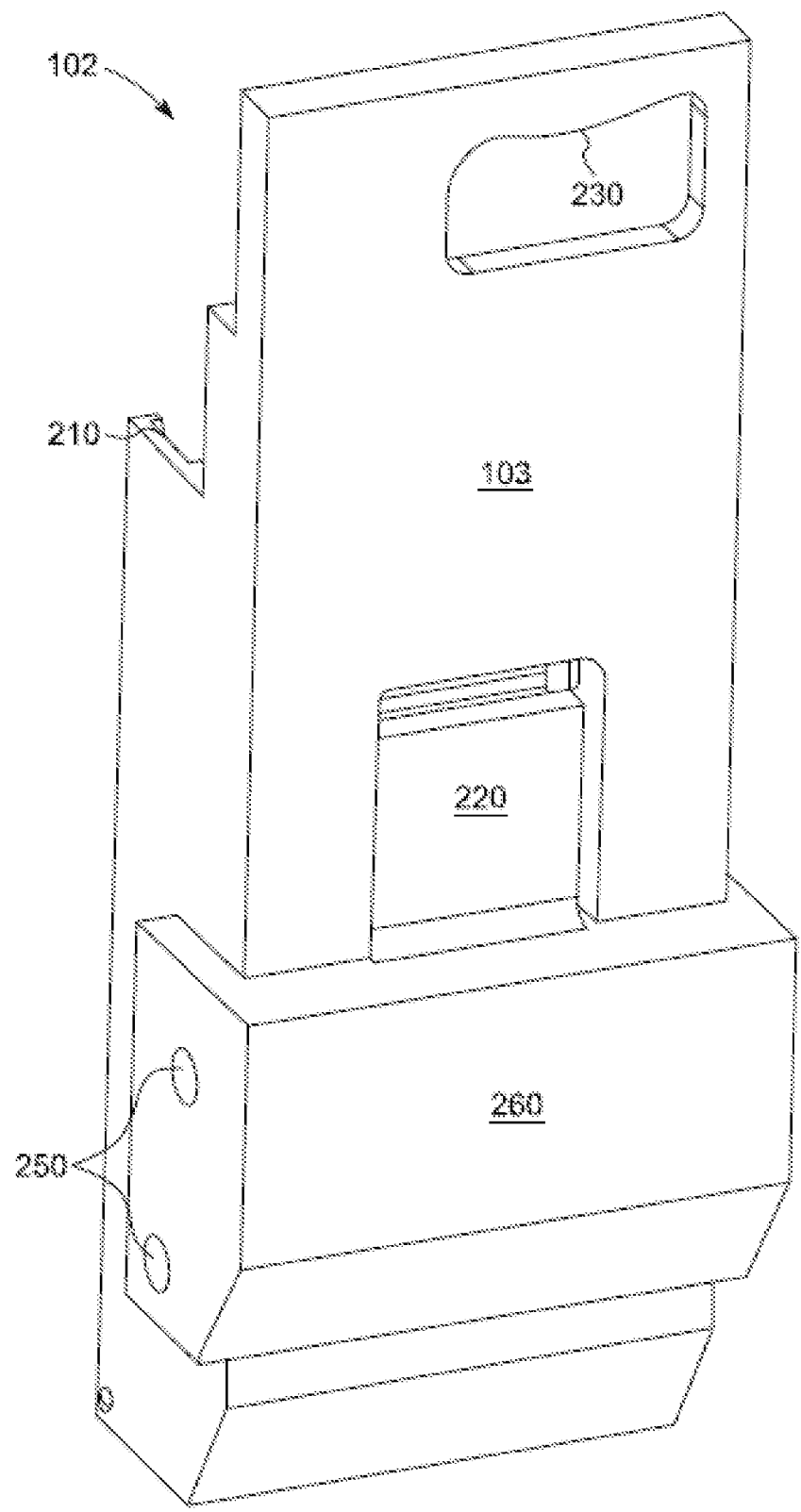
FIG. 3 illustrates a perspective rear view of the stationary support member as shown in FIG. 2, according to an aspect of the present disclosure.

FIG. 3 illustrates a perspective rear view of the stationary support member 102 as shown in FIG. 2, according to an aspect of the present disclosure. The conductive bar 260 passes through a portion of the stationary support member's main body 103, and is configured to provide electrical conductivity with the collector mount 110 and the fork electrical connector 220. This arrangement enables the stationary support member 102 to be fully electrically insulated and the current to pass from the horseshoe 110 to the fork 220 through the conductive bar 260. The holes 250 to mount to the horseshoe 110 are formed in conductive bar 260. In alternative embodiments, the conductive bar 260 may be lengthened so that multiple stationary supports 102 could be attached to the same (longer) conductive bar 260. The conductive bar 260 may be attached to the stationary support 102 and the fork electrical connector 220 via bolts (not shown) that run down through tabs 270 and into the stationary support, and into or through the conductive bar 260. In this example, one tab/boss 270 is shown on each side of the electrical fork 220. The fork electrical connector 220 may also be formed integrally with the conductive bar 260.

The stationary support member 102 may be configured to accept one, two (as shown), three, or more brush holders. One aspect would be a stationary support member that accepts one, two or three brushes, and multiple stationary support members and can be arranged side-by-side for applications needing a specific number of brushes at a given circumferential location on the collector horseshoe. The stationary support member 102 and/or the brush holder may be formed substantially (or comprised) of aluminum, an aluminum alloy, stainless steel or any other suitable electrically conductive or electrically non-conductive material as desired in the specific application. As one non-limiting example only, the stationary support member 102 and the brush holder 104 may be formed substantially (or comprised) of a passivated or anodized aluminum, or a passivated or anodized aluminum alloy. This material will give good strength while providing an electrically insulating or electrically semi-insulating material. It is desired to minimize current flow through the brush holder body and focus the current flow through the brushes and electrical path of the brush holder designed for this current flow. In addition, it would be desirable to minimize (or even block) any current flow to portions that may be grasped by a technician during insertion or removal. Also, it is desirable to avoid the possibility of current arcing directly from the collector ring 120 to the brush holder 104 or to the stationary support member 102 when a brush 432 is worn out and no longer able to be part of the path for the current. At least a portion of a surface of at least one of the stationary support member and the brush holder is configured to be substantially electrically insulating. For example, the handle of the brush holder should be substantially electrically insulating to protect a technician during insertion or removal of the brush holder on an operating machine. Alternatively, the stationary support member and the brush holder may be formed substantially (or comprised) of a powder coated or painted aluminum or a powder coated or painted aluminum alloy or a powder coated metallic or non-metallic material or a ceramic coated metallic or ceramic coated non-metallic material.

Figure 4:
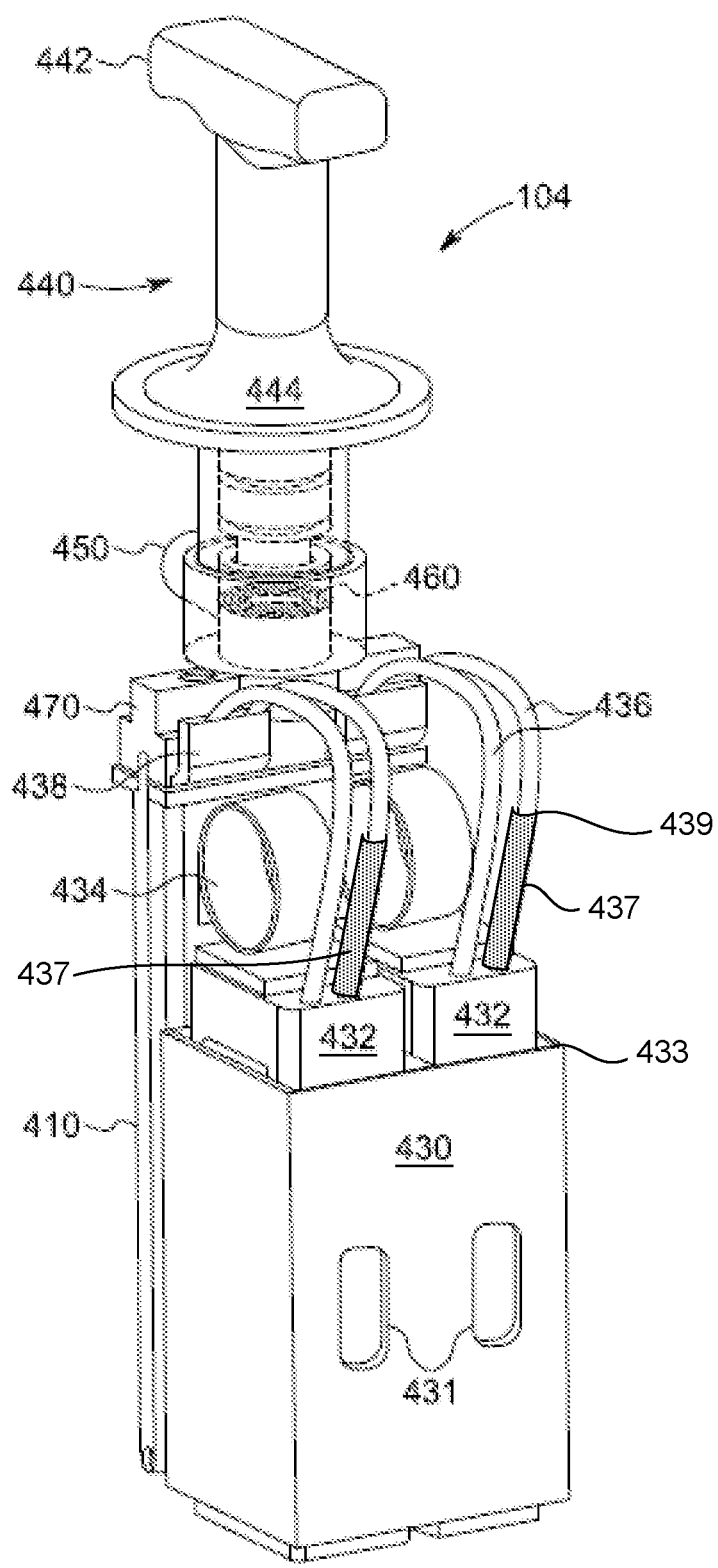
FIG. 4 illustrates a perspective front view of the brush holder, according to an aspect of the present disclosure.
Figure 5:
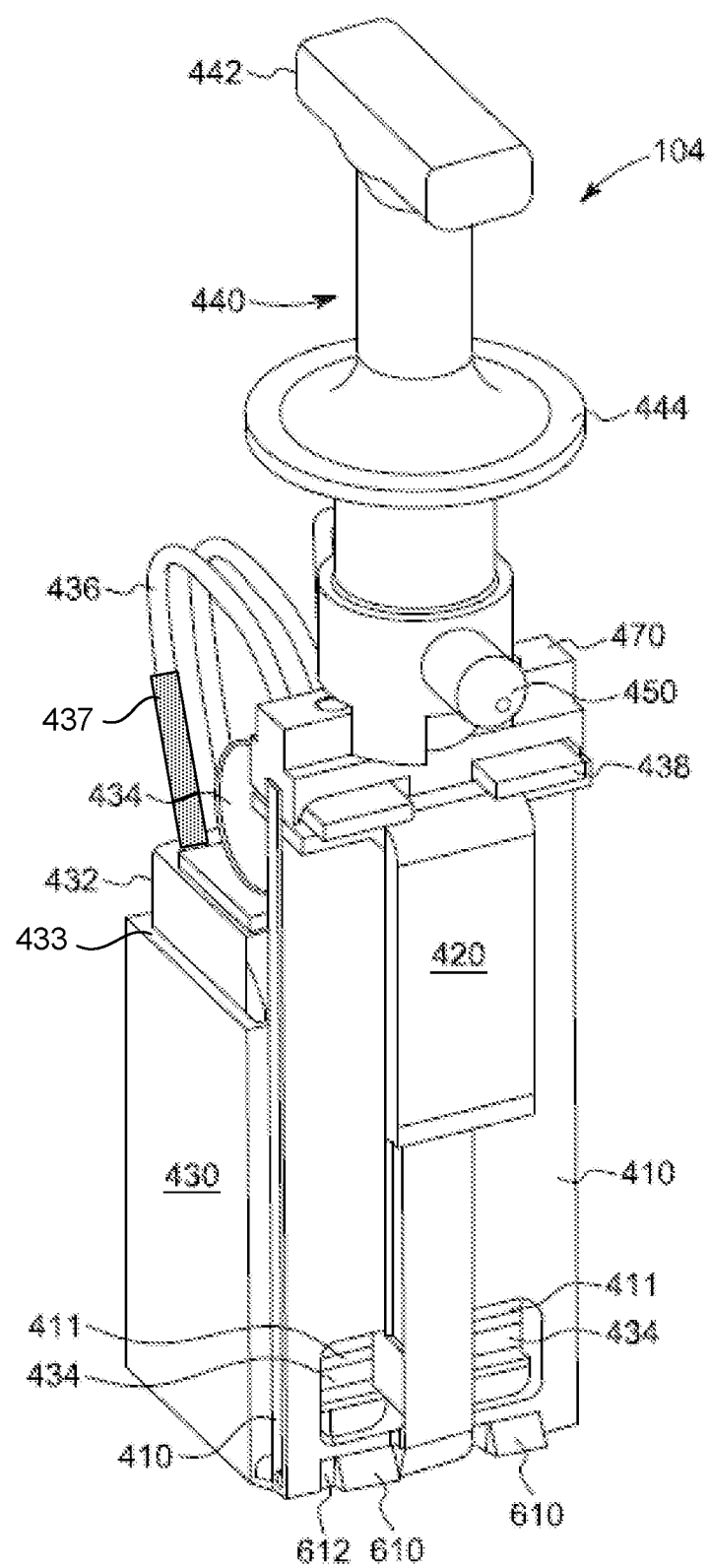
FIG. 5 illustrates a perspective rear view of the brush holder, according to an aspect of the present disclosure.

FIG. 4 illustrates a perspective front view of the brush holder 104, according to an aspect of the present disclosure. FIG. 5 illustrates a perspective rear view of the brush holder 104, according to an aspect of the present disclosure. The brush holder 104 is configured to be releasably affixed to the stationary support member 102. At least one rail 410 is configured to slide along groove 210. In the example shown the brush holder 104 includes two rails 410, one on each side of the brush holder. A knife electrical connector 420 (shown in FIG. 5), configured to mate with the fork electrical connector 220, is located on the rear of the brush holder 104. A brush retaining box 430 retains one or more brushes 432 in the axial and circumferential directions. In the example shown, box 430 retains two brushes 432. The brushes 432 are biased radially downward by brush springs 434. Apertures 431 form windows in the box 430 and allow the brushes 432 to be seen and visually monitored for wear.

The brush holder 104 includes a handle assembly 440 that includes an electrically insulating handle 442 and an electrically insulating guard 444 or shield that is located between the handle 442 and the brush connector leads 436. The brush connector leads 436 carry high voltage and current while the dynamoelectric machine is operating, so these present a hazard to be avoided. The electrically insulating handle 442 and guard 444 will prevent a technician's hand from coming into contact with the energized brush connector leads 436. The handle 442 and guard 444 may be comprised of plastic, rubber, epoxy/fiberglass laminate, fiberglass, or any other suitable electrically insulating material.

The brush lead 436 is an elongate conductive member, such as a wire or cable, and is electrically and physically connected to the brush 432 and brush terminal 438. A brush wear indicator 437 is disposed over the brush lead 436. In one example, the brush wear indicator 437 may be a heat shrunk tube with adhesive located between the brush lead and heat shrunk tube. The adhesive provides additional bonding force between the brush wear indicator 437 and brush lead 436. The brush wear indicator 437 may also have a contrasting color to the color of the brush holder. Contrasting is defined with the commonly accepted meaning of "to compare in order to show unlikeness or differences in appearance". For example, if the brush box 430 is gray in color, then the brush wear indicator 437 could be red in color. Red and gray are contrasting colors, and the red brush wear indicator would stand out and be easily distinguishable against the gray color of the brush box. The brush wear indicator 437 may also be configured or positioned so that a top end 439 of the brush wear indicator 437 is at or below a top end 433 of the brush box 430 when brush replacement is indicated, recommended or desired.

The locking pin 450 is configured for cooperation with the tapered slot 230 in the stationary support member 102. The handle assembly 440 can rotate, and as it rotates the locking pin 450 is rotated into, or out of, the tapered slot 230. The views of FIGS. 4 and 5 show the locking pin 450 and handle 442 oriented in the locked position. In this locked position the locking pin 450 is fully inserted into the slot 230 and the tapered surface drives the locking pin radially downward. In other words, the handle assembly 440 is configured to be rotated about 90 degrees, a 0 degree position configured so that the locking pin 450 is disengaged from the tapered slot 230 so that the brush holder 104 may be removed from the stationary support member 102. A 90 degree position (as shown in FIGS. 4 and 5) is configured so that the locking pin 450 is engaged in the tapered slot 230 so that the brush holder 104 is fully locked into operating condition on the stationary support member 102. By having the handle 442 oriented parallel to the locking pin 450 and having the locking pin 450 extend through the tapered slot 230, the operator can easily see that the brush holder 104 is fully inserted and locked in place within the stationary support 102.

A spring assembly 460 is housed within the handle assembly 440, and the spring assembly is mechanically connected to the brush terminal compression plate 470 (two of which are shown). The brush terminal compression plate may be one piece that extends through the shaft of the handle, but it could also be fabricated from two pieces. The brushes 432 are connected to the brush terminals 438 via brush connector leads (or pigtails) 436. The brush terminals 438 are electrically connected to the knife electrical connector 420. For example, the knife electrical connector includes an electrically conductive base member that extends under each brush terminal 438, thereby making an electrically conductive path. The spring assembly 460 biases the compression plates 470 downward and this downward pressure retains the brush terminals in place and against the base member of the knife electrical connector 420. This is particularly advantageous when the brush holder 104 is being inserted (or removed from) the stationary support member 102. It is advised to use only one hand when manually inserting or removing the brushes, and the spring assembly ensures that a second hand is not required to keep the brush terminals 438 in place. Once the brush holder 104 is fully inserted into the stationary support member, the handle 442 is rotated 90 degrees (into a locked position) and the tapered slot 230 forces the locking pin 450 (as well as brush holder 104) radially downward applying additional force onto the brush terminals 438. An advantage of this design is that the brush holder 104 is configured to clamp a brush terminal 438 between a terminal compression plate 470 and an opposing surface of the brush holder (i.e., the electrically conductive base member of knife electrical connector 420), so that the brush terminal is engaged or released manually, only by hand or without the use of any tools. The term "tool" or "tools" is defined as "an implement, especially one held in the hand, such as a hammer, saw, wrench or file, for performing or facilitating mechanical operations". All that is required is manual placement of the respective parts by hand. Minimizing or eliminating the use of specific tools can greatly simplify and increase the safety of working around dynamoelectric machines, especially when they are operating and energized.

As illustrated, the brush box 430 is configured to hold two brushes 432. However, the box 430 can be configured to hold one brush 432 (by reducing the width of the box) or three or more brushes (by increasing the width of the box and providing additional individual brush apertures). The brush terminal 438 includes a downward bend located at a proximal end thereof. This bend helps to keep the brush terminal in place under the compression plate 470. A hole or notch could also be provided in the brush terminal that cooperates with a complementary feature on the terminal compression plate 470 or the electrically conductive base member of knife electrical connector 420. For example, if the brush terminal 438 included a hole in the center thereof, the compression plate 470 could have a complementary pin located to engage the hole of the brush terminal. This complementary feature on the brush holder facilitates securing the brush terminal to the brush holder. The inverse could also be used, with the brush terminal having a complementary pin and the compression plate having the hole. With this arrangement, the brush holder 104 is configured to electrically and mechanically connect the knife electrical connector 420 to the brush terminal 438, while both the knife electrical connector 420 and the brush terminal 438 are electrically insulated from handle 442.

As the brush 432 wears down due to frictional contact with the rotor collector ring 120, the brush spring 434 will keep the eroding surface of the brush 432 in contact with the rotor collector ring 120. The brush spring 434 is configured to press the brush 432 radially downward and against the collector ring 120, because the spring 434 is designed with tension to re-coil itself. In this manner, the coil at the top of the spring 434 wants to re-tighten or coil downward, thereby applying a radially downward force to brush 432. The spring 434 is clipped on the bottom of the brush holder 104. For example, a lower part of main body portion 411 of the brush holder is where the brush spring 434 attaches to the brush holder. The bottom of the brush spring 434 is U-shaped, and the U-portion fits over and clips onto lower part of main body portion 411. The brush spring 434 is also configured to be located in-line with, or offset by 90 degrees from, the cam member 610 configured for restraining the brush 432 against the brush holder or box 430. This in-line arrangement is aligned so that any potential binding is reduced or eliminated and smooth operation is permitted between the spring 434, brush 432 and cam members 610.

Figure 6:
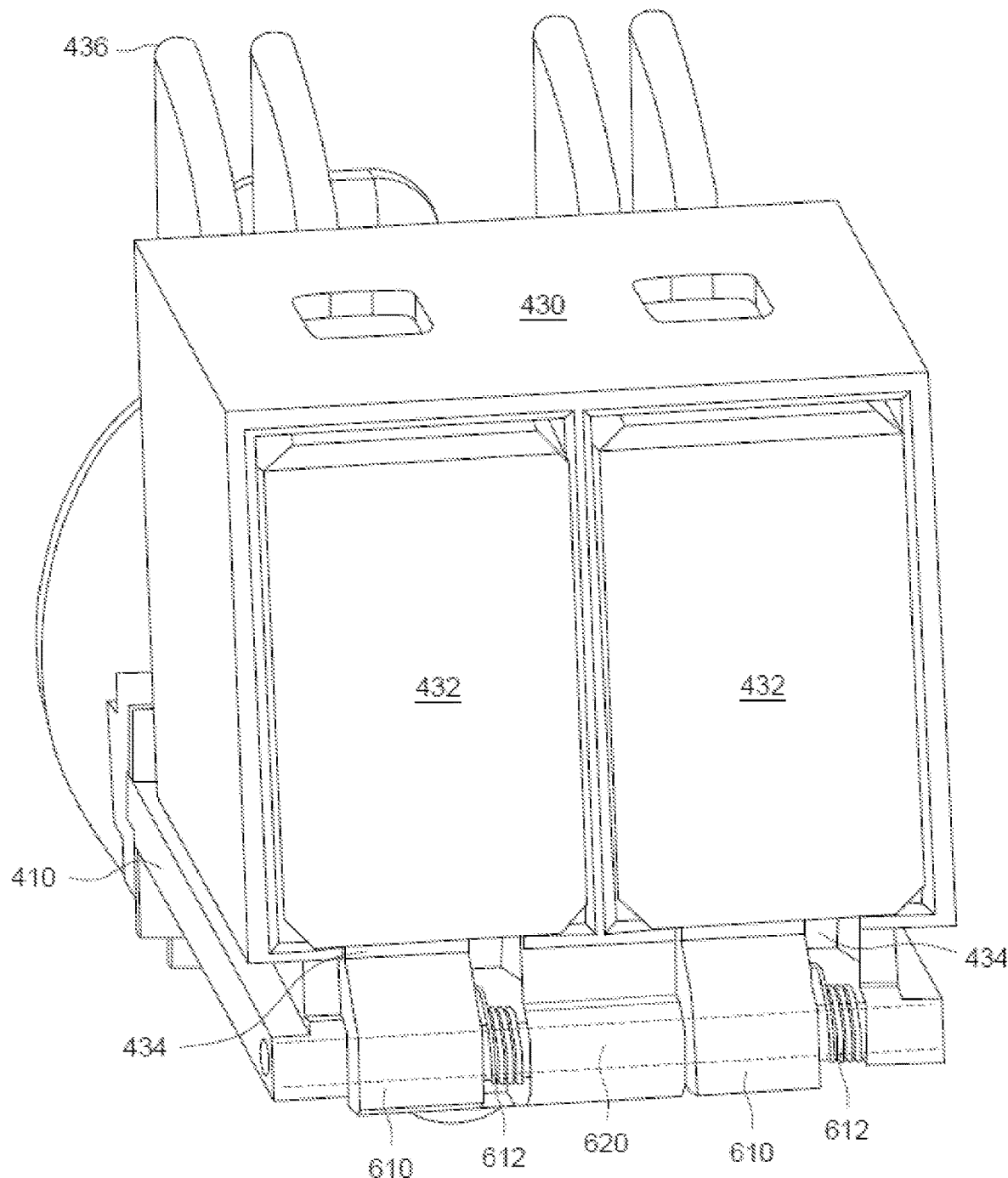
FIG. 6 illustrates a bottom view of the brush holder and the cam members used to retain the brushes, according to an aspect of the present disclosure.

FIG. 6 illustrates a bottom view of the brush holder 104 and the cam members 610 used to retain the brushes 432, according to an aspect of the present disclosure. A cam member 610 is operably connected to the shaft 620 near a bottom of the brush holder 104. The cam member 610 is configured to retain the brush 432 against the brush holder or box 430 until the brush holder 104 is fully inserted in the stationary support member 102. The cam member 610 may be constant-angle cam shaped, or have an arcuate toothed shape and is mounted with a spring 612 (e.g., a torsional spring) to shaft 620. The constant-angle cam shape and arcuate toothed shape may be consistent with logarithmic spiral geometry. That means that no matter how much the cam member 610 is rotated in order to reach the brush 432 surface, the cam 610 will contact the brush 432 with the same angle and same large force to resist sliding of the brush within the brush holder 104. Not all brushes may be exactly the same size so it is important that each cam member 610 is free to independently rotate on the shaft 620 to the fill the actual gap between the shaft 620 and the corresponding brush 432 surface.

Figure 7:
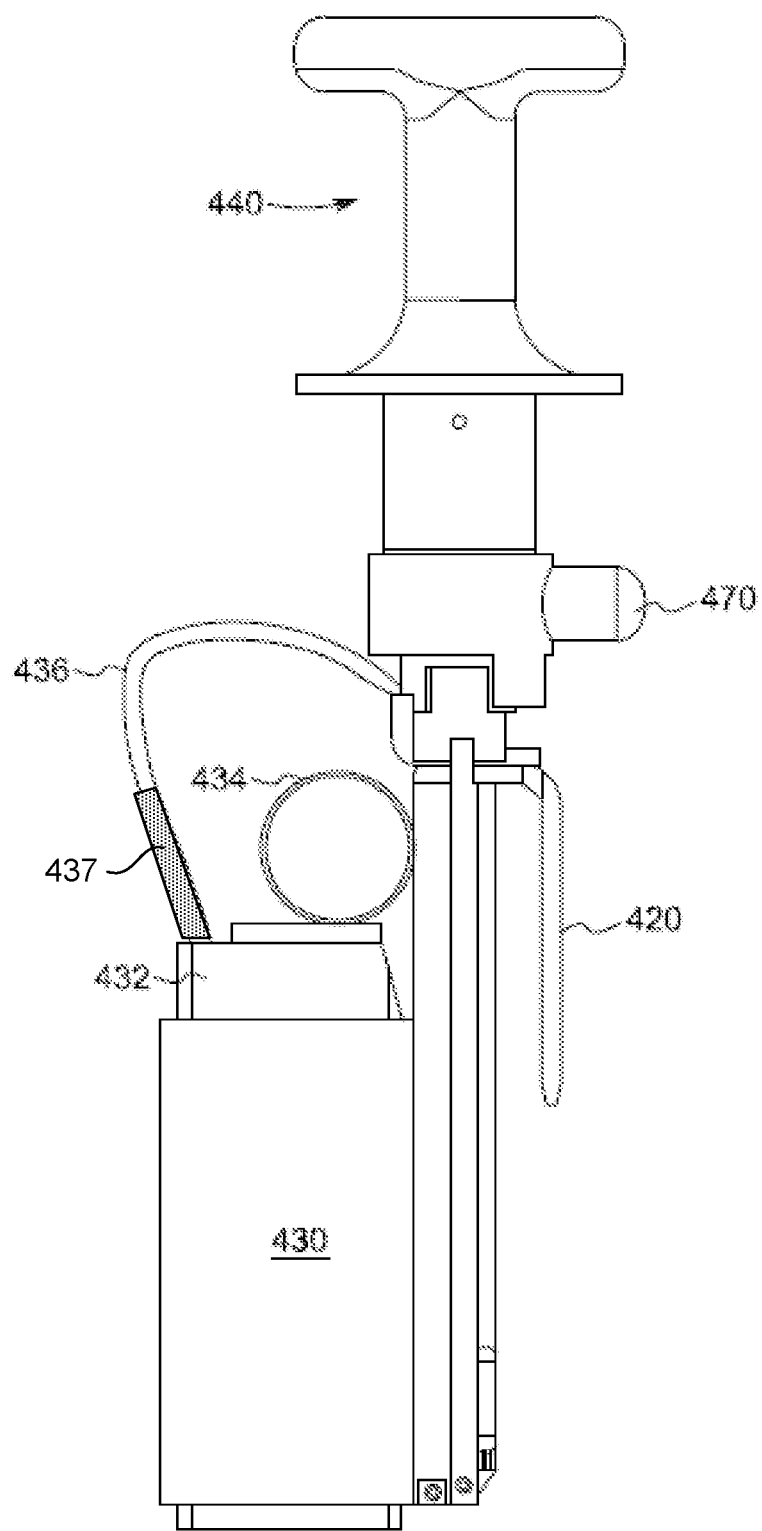
FIG. 7 illustrates a side view of the brush holder, according to an aspect of the present disclosure.

FIG. 7 illustrates a side view of the brush holder 104, according to an aspect of the present disclosure. The knife electrical connector 420 is configured so that it slides into and makes electrical contact with the fork electrical connector 220. The knife electrical connector 420 extends down to a point below a top of the brush holder box 430.

Figure 8:
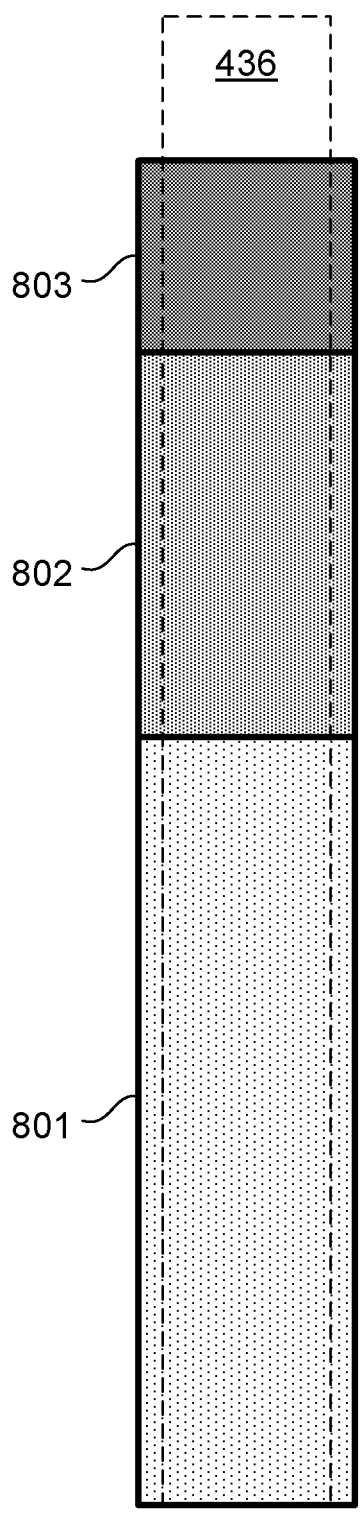
FIG. 8 illustrates a side view of the brush wear indicator, according to an aspect of the disclosure.

FIG. 8 illustrates a side view of the brush wear indicator 437, according to an aspect of the disclosure. The brush wear indicator 437 may have multiple zones 801, 802, 801, and each of these zones may have a different color or pattern that correspond to a remaining brush life value or range. As an example, zone 801 may be colored green, indicating a higher time period or value of brush life, zone 802 may be colored yellow, indicating brush wear is occurring, but sufficient brush life remains, and zone 803 may be colored red indicating that brush life is nearing its end and brush replacement will be due soon. Each zone may have different patterns, for example, zone 801 is shaded lightly, zone 802 is shaded a darker color and zone 803 has even darker shading then zone 802. The patterns may also include variations of cross-hatching, lines of varying angles or another suitable variation of patterns that distinguishes one zone from the next. As the brush 432 wears it will travel radially downward or inward (with respect to the generator) and the top of the brush wear indicator will travel towards the top end 433 of the brush box 430. When the brush is new, the entire brush wear indicator can be seen by a technician, however, less and less of the brush wear indicator will project above top end 433 as the brush wears over use.

Figure 9:
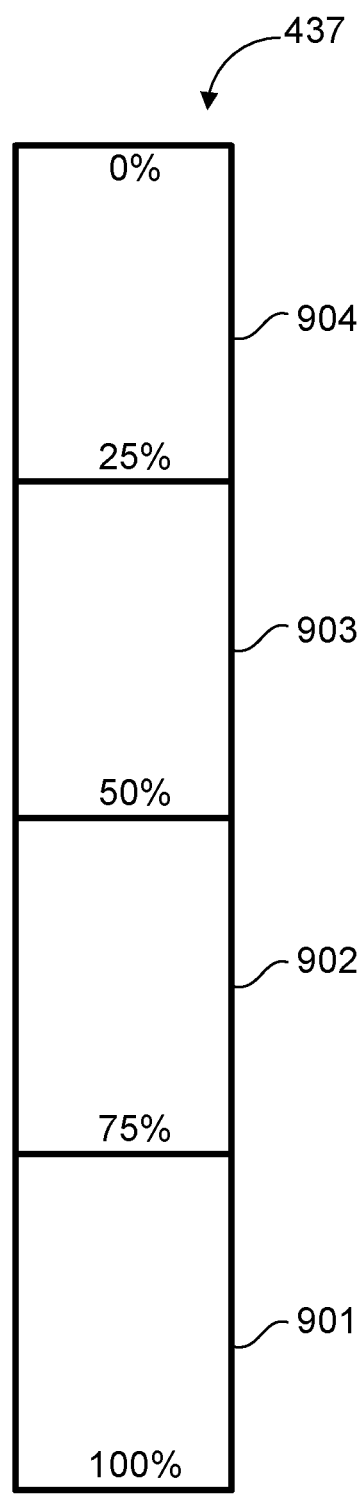
FIG. 9 illustrates a side view of the brush wear indicator, according to an aspect of the disclosure.

FIG. 9 illustrates a side view of the brush wear indicator 437, according to an aspect of the disclosure. The brush wear indicator 437 includes indicia indicating an approximate brush life remaining. The bottom of zone 901 has the value 100% printed thereon, and this indicates a maximum brush life. Zone 902 has 75% printed thereon and when the line under 75% is at the same height of the top end 433 of the brush box 432 then 75% of the brush life remains. The bottom of zone 903 has 50% printed thereon and when the line under 50% is at the same height of the top end 433 of the brush box 432 then half of the brush life remains. The bottom of zone 904 has 25% printed thereon and when the line under 25% is at the same height of the top end 433 of the brush box 432 then 25% of the brush life remains. The top of zone 904 has 0% printed thereon and when the line above 0% is at the same height of the top end 433 of the brush box 432 then the brush life is at or near its end and the brush should be replaced. Zones 901-904 may also have different patterns or colors to aid in quick evaluation of the remaining brush life or brush status.

Figure 10:
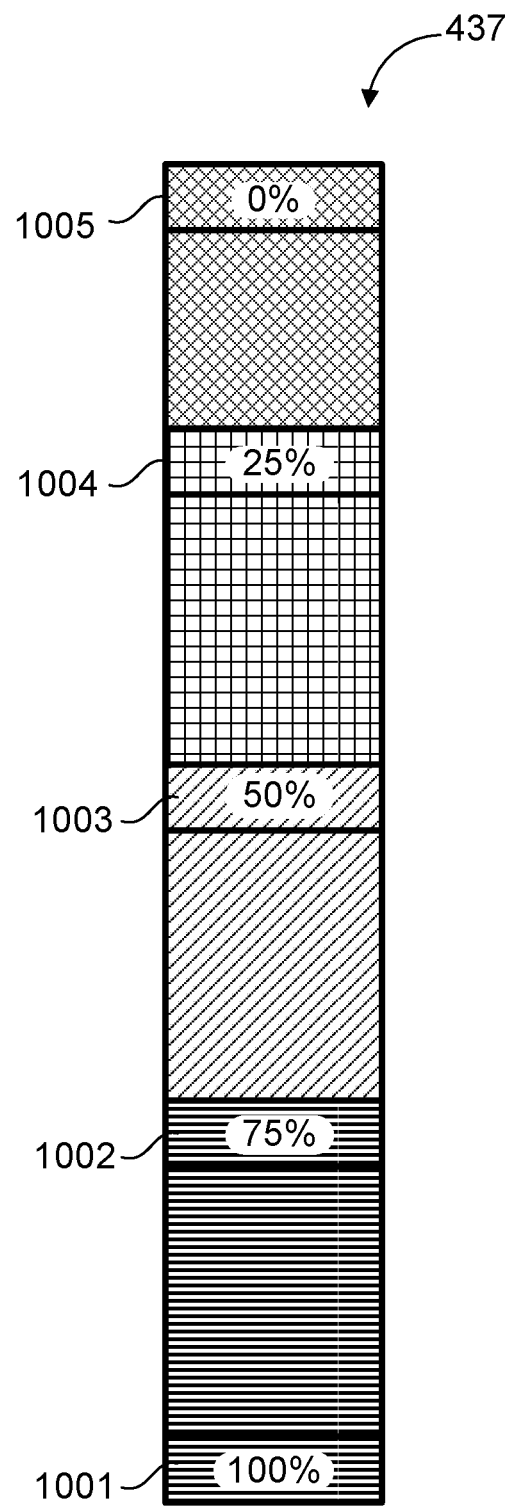
FIG. 10 illustrates a side view of the brush wear indicator, according to an aspect of the disclosure.

FIG. 10 illustrates a side view of the brush wear indicator 437, according to an aspect of the disclosure. The brush wear indicator 437 includes multiple bands 1001, 1002, 1003, 1004, 1005 indicating approximate brush life remaining. Band 1001 indicates 100% brush life remaining, or when a new brush has been installed. Band 1001 may have a specific pattern or color (e.g., green). Band 1002 indicates 75% brush life remaining, and may have a specific pattern or color (e.g., green). Band 1003 indicates 50% brush life remaining, and may have a specific pattern or color (e.g., yellow). Band 1004 indicates 25% brush life remaining, and may have a specific pattern or color (e.g., orange). Band 1005 indicates 0% brush life remaining, and may have a specific pattern or color (e.g., red) and when this is reached the brush should be replaced. All of the brush life remaining indicators 437, herein described, may be configured to have specific regions thereof align with the top end 433 of the brush box 430, or with apertures 431 formed in the brush box walls.

A technical effect of the present invention is a brush wear indicator that allows for easier visual inspection of brush wear, and no potential for hangup of the brush wear indicator 437 on the edge of the brush box 430. The brush wear indicator 437 ensures that the brush 432 is free to slide within the brush box 430 while at the same time providing a visual indication of brush wear or remaining brush life.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate+/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A brush holder apparatus comprising:
a stationary support member having two opposing grooves, the stationary support member having a fork electrical connector, the stationary support member having a conductive bar configured to pass through a portion of a main body of the stationary support member, the conductive bar configured to provide electrical conductivity with a collector mount and the fork electrical connector;
a brush holder configured to be releasably affixed to the stationary support member, the brush holder having two rails configured to slide along the grooves, the brush holder having a knife electrical connector configured to mate with the fork electrical connector, and a brush spring configured to be clipped on the brush holder, the brush spring configured to press a brush against a collector of a dynamoelectric machine, a brush lead connected to the brush and a brush terminal, the brush lead comprising an elongate conductive member and a brush wear indicator disposed over the brush lead; and
wherein the stationary support member is configured for electrical connection to the collector mount and the brush holder is configured to retain the brush.

2. The brush holder apparatus of claim 1, wherein the brush wear indicator is a heat shrunk tube with adhesive located between the brush lead and the heat shrunk tube.

3. The brush holder apparatus of claim 1, wherein the brush wear indicator has a contrasting color to a color of the brush holder.

4. The brush holder apparatus of claim 3, the brush wear indicator having multiple zones, each of the multiple zones having a different color or pattern that correspond to a remaining brush life range.

5. The brush holder apparatus of claim 1, the brush wear indicator configured so that a top end of the brush wear indicator is at or below a top end of a brush box when brush replacement is indicated.

6. The brush holder apparatus of claim 1, the brush wear indicator comprising a band configured and located so that the brush wear indicator is at or below a top end of a brush box when brush replacement is indicated.

7. The brush holder apparatus of claim 1, the brush wear indicator comprising indicia indicating approximate brush life remaining.

8. The brush holder apparatus of claim 7, the indicia comprising one or more of:
multiple bands configured and located so that each band is at a top end of a brush box for a specific brush life remaining value; or
numeric indicia indicating the brush life remaining in percent values.

9. The brush holder apparatus of claim 1, the brush holder further comprising:
a handle assembly comprising an electrically insulating handle having an electrically insulating guard configured to be located between the handle and brush connector leads, the handle assembly having a spring assembly mechanically connected to a brush terminal compression plate, the spring assembly configured to apply pressure to one or more brush terminals at least until the electrically insulating handle is in a locked position.

10. The brush holder apparatus of claim 1, wherein the brush holder is configured to clamp the brush terminal between a terminal compression plate and an opposing surface of the brush holder, and wherein the brush terminal is engaged manually or without the use of any tools.

* * * * *